No. 680,061. Patented Aug. 6, 1901.
C. MOEHRING.
BEARING FOR DISK DRILLS.
(Application filed May 24, 1901.)
(No Model.) 2 Sheets—Sheet 1.
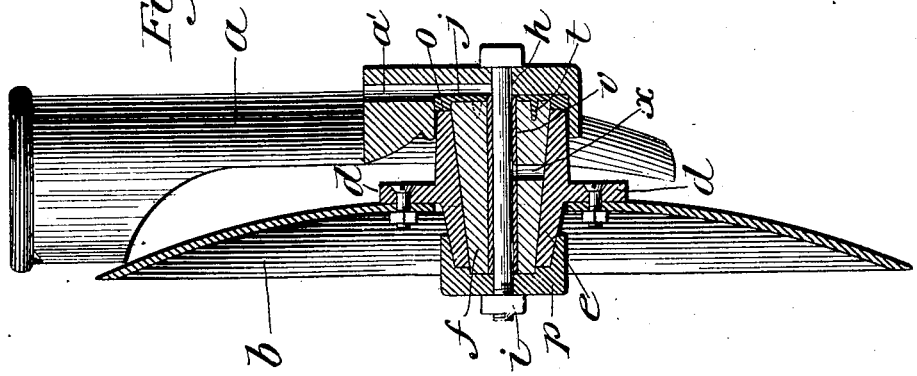
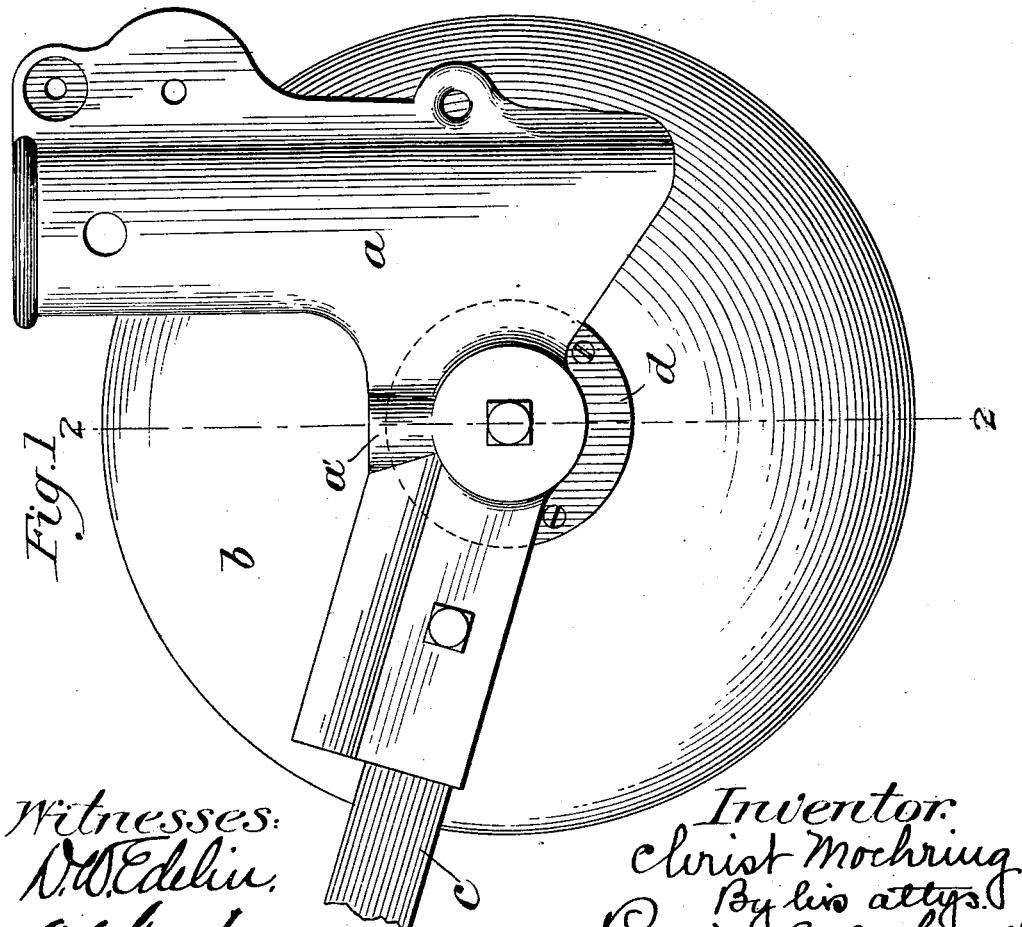

No. 680,061. Patented Aug. 6, 1901.
C. MOEHRING.
BEARING FOR DISK DRILLS.
(Application filed May 24, 1901.)
(No Model.) 2 Sheets—Sheet 2.
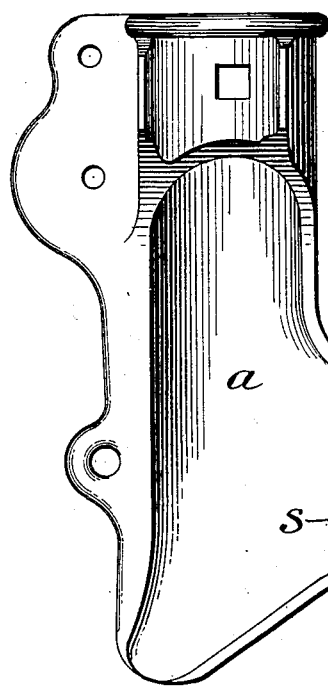
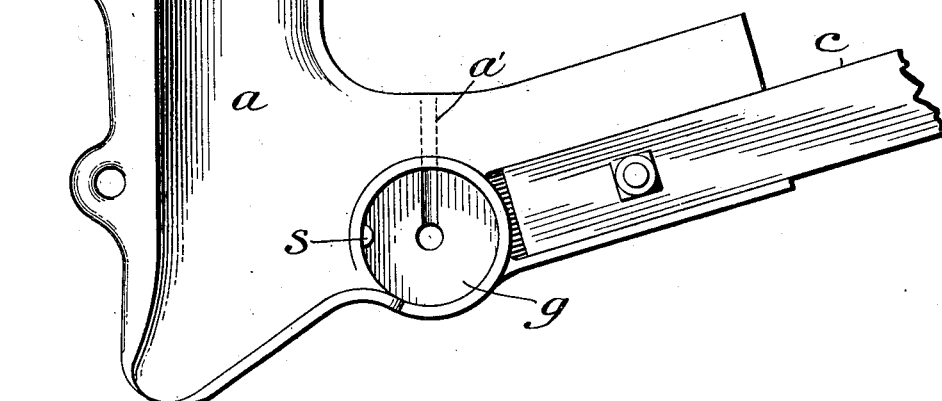
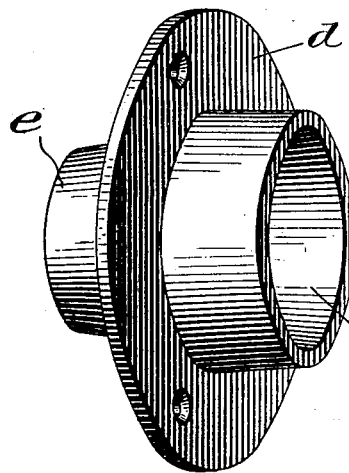
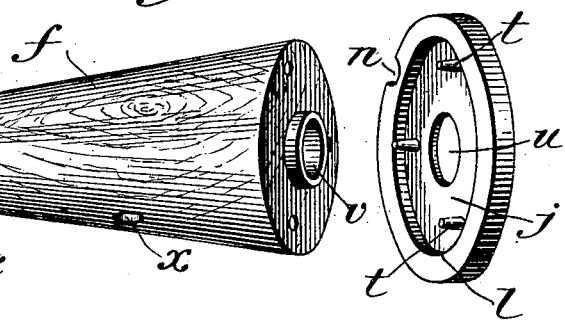
Witnesses:
O. W. Edlin.
A. E. Grant
Inventor:
Christ Moehring
By his attys.
Pennie & Goldsborough
THE NORRIS PETERS CO., PHOTO-LITHO., WASHINGTON, D. C.

UNITED STATES PATENT OFFICE.

CHRIST MOEHRING, OF MIDDLETOWN, OHIO, ASSIGNOR TO THE McSHERRY MFG. COMPANY, OF SAME PLACE.

BEARING FOR DISK DRILLS.

SPECIFICATION forming part of Letters Patent No. 680,061, dated August 6, 1901.

Application filed May 24, 1901. Serial No. 61,771. (No model.)

*To all whom it may concern:*

Be it known that I, CHRIST MOEHRING, a citizen of the United States, residing and having my post-office address at Middletown, in the county of Butler, State of Ohio, have invented certain new and useful Improvements in Bearings for Disk Drills and the Like; and I do hereby declare the following to be a full, clear, and exact description of the invention, such as will enable others skilled in the art to which it appertains to make and use the same.

The invention relates generally to seeding-machines, and has been designed with particular reference to improving a type of drills that are now well known as "disk" drills, where revolving disks are employed in lieu of teeth for the purpose of opening the furrows to receive the grain or seed.

The invention consists in particular improvements in the bearings for the disks; and the objects aimed at has been to reduce the draft of the drills and lengthen the life of the bearings without sacrificing either the strength and durability of the construction or the handiness of the mechanical parts; also, to enhance the general efficiency of the machines and to reduce the cost of manufacture and maintenance.

With these objects in view the invention is illustrated in the following drawings.

Figure 1 is a side elevation of a drill-disk, showing the seed-conduit casting and a portion of the drag-bar. Fig. 2 is a vertical transverse section on the line 2 2 of Fig. 1. Fig. 3 is a side elevation of the conduit-casting shown in Fig 1, taken from the side adjacent to the disk and showing in detail the connection of the drag-bar thereto and the socket into which the journal is secured. Fig 4 is a perspective of the boxing for the disk. Fig. 5 is a similar view of the journal, and Fig. 6 is a perspective of the plate or disk that is secured in the socket and to which the journal is attached in the manner hereinafter described.

Referring to these views, $a$ denotes the seed-conduit casting, $b$ the disk, and $c$ a drag-bar, through the intermediacy of which the disk and conduit are connected to a forward point on the machine-frame, so as to be drawn or trailed along over the ground in a manner well understood in this class of drills. The disk is bolted or otherwise secured to a radial flange $d$, which stands out from the periphery of a metallic boxing $e$ about midway of its length. This boxing revolves on a journal $f$, made of wood and secured to the drag-bar through the intermediacy of the casting $a$, into a socket $g$ on the inner or disk side of which the wooden journal is fixedly secured by means of a headed bolt $h$, which passes longitudinally through the journal and is provided at its opposite end with a clamping-nut $i$. As shown in Figs. 2 and 5, this journal is made in the form of a truncated cone or conic frustum, with its larger end toward its point of support in the socket and away from the concave side of the disk, where the strain comes in the operation of the machine. It forms a stationary bearing and support upon and around which the boxing and disk turn.

The invention is not particularly concerned with the location or manner of securing the disk to the boxing, nor is the external form or construction of the boxing itself a feature of the invention. It is to be noted, however, that the barrel of the boxing tapers toward the concave side of the disk, so as to conform accurately to the superficial conical formation of the journal, the object of this arrangement being to secure for the disk an increased area of bearing-surface opposed to the side strains on the disk over that of ordinary cylindrical bearings, and thereby to transfer to the journal proper some of the thrust of these strains, which in the prior constructions has heretofore been borne mainly by the ends of the journal and its boxing. In order to fix this conical wooden journal in the socket and also to provide an iron shoulder for the disk-boxing to work against, I set into the socket $g$ a metal disk or plate $j$, the outer side of which fits flat against the bottom of the socket and the inner side of which is provided with nibs or teats $t$. The disk $j$ is also provided with a circumferential flange $l$, extending at right angles to its face, as best shown in Figs. 2 and 6, and a notch $n$ is cut in the periphery of the disk to fit over a stud or lug $s$ in the side wall of the socket.

As will be understood from an inspection of the drawings, the journal is held to its seat in the socket by the bolt $h$. This fastening is not, however, sufficient to prevent the turning of the journal, and the teats $t$ and notch $n$ coöperate with the bolt to effect the holding of the journal in fixed position—first, by the engagement of the notch $n$ and lug $s$ holding the disk $j$ against rotation, and, second, by the engagement of the teats, which are driven into the larger end of the wooden journal, preventing the journal itself from turning with respect to the disk.

In assembling the parts the disk $j$ is fitted over the larger end of the journal, the flange $l$ fitting around and overlapping the edge of the latter, so as to afford the above-described metal shoulder $o$, against which the end of the boxing $e$ may abut.

At its opposite and smaller end the journal $f$ is covered by a cap $p$, having a circumferential edge flange which overlaps and encircles also the outer edge of the disk-boxing, so as to cover and protect this end of the bearing against the entrance of dust, grit, dirt, &c. This cap may be only a cap, as when the disk is carried by a single drag-bar, or where two drag-bars are used, one on each side of the disk, it may be a socket on the inner side of the corresponding drag-bar similar to the socket $g$ on the other end of the bearing; but whether a mere cap or a part of another drag-bar the journal $f$ is clamped by means of the bolt $h$ between it and the opposite drag-bar or conduit-casting, so as to be held fixedly thereto against turning, and in the particular construction shown in the accompanying drawings the socket $g$ covers and protects the parts at the larger end of the journal and prevents the entrance of dust, grit, &c., at that point.

Referring again to Figs. 2 and 5, it will be noted that the wooden journal $f$ is bored out longitudinally in the center from one end to the other. Into this tubular or hollow center I secure a metallic pipe or sleeve $v$, the end of which, at the larger end of the journal, projects and fits into the central hole $u$ of the disk $j$. Through the metal-lined center of the journal the clamping-bolt passes, by means of which the whole bearing is secured to the casting. This interior lining-tube also enables me to conduct the oil for lubricating the bearing from the usual oil-duct $a'$ in the conduit-casting to and along the bearing to a point preferably midway of the length of the journal, where it is delivered through a transverse opening or perforation $x$ in the tube and through the journal into contact with the surface to be oiled, which arrangement is preferable to delivering it at the end only.

The construction of my improved bearing being as thus described it is believed that the operation and advantages of the features of improvement will be readily understood and appreciated by those skilled in the art without further or more particular description. It may, however, be stated that although, as explained at the outset, the bearing has been designed with particular reference to disk drills it is obviously also adapted for other agricultural machines and implements and especially machines having gangs of independently supported and operating disks that work yeildingly near the surface of the ground.

Having thus described my invention, what I claim is—

1. In a bearing for disk drills and the like, the combination with the disk and its drag bar or bars, of a wooden journal on which the boxing of the disk turns.

2. In a bearing for disk drills and the like, the combination with the disk and its drag bar or bars, of a wooden journal on which the boxing of the disk turns, said journal having a tubular or hollow center.

3. In a bearing for disk drills and the like, the combination with the disk and its drag bar or bars, of a wooden journal on which the boxing of the disk turns, said disk having a longitudinally tubular or hollow center and a transverse opening between its ends.

4. In a bearing for disk drills and the like, the combination with the disk and its drag bar or bars, of a wooden journal on which the boxing of the disk turns, said journal having a tubular or hollow center inclosing a metallic sleeve.

5. In a bearing for disk drills and the like, the combination with the disk and its drag bar or bars, of a wooden journal on which the boxing of the disk turns, said journal being clamped against rotation between metal disks or plates at its ends.

6. In a bearing for disk drills and the like, the combination with the disk and its drag bar or bars, of a wooden journal on which the boxing of the disk turns, and a metal disk or plate held against rotation in the bearing, and engaging one end of the journal so as to prevent the same from turning.

7. In a bearing for disk drills and the like, the combination with the disk and its drag bar or bars, of a socket, a metal disk or plate held in said socket against rotation, a wooden journal clamped against said plate so as not to turn, a metallic sleeve passing centrally through said journal, an oil-duct communicating with one end of the sleeve, and an opening leading from the sleeve at a point between the ends through the journal to the interior of the boxing.

8. A journal for the bearings of disk drills and the like, the same consisting of a wooden truncated cone.

9. A journal for the bearings of disk drills and the like, consisting of a wooden truncated cone having a tubular metallic center.

10. A journal for the bearings of disk drills and the like, consisting of a wooden truncated cone having a tubular metallic center, and a metal cap or disk at one end.

11. In a bearing for disk drills and the like, the combination with the disk and its drag bar or bars, of a socket, a metal disk or plate held in said socket against rotation, a conical wooden journal clamped against said plate so as not to turn, a metallic sleeve passing centrally through said journal, a conical boxing for the disk turning on said journal, a cap inclosing the small end of the journal and the edge of the boxing, an oil-duct communicating with one end of the sleeve, a transverse opening in the sleeve and bearing for conducting the oil to the interior of the boxing, and a clamping-bolt passing through the sleeve and clamping the same between the cap and the plate fixed in the socket.

In testimony whereof I affix my signature in presence of two witnesses.

CHRIST MOEHRING.

Witnesses:
WILLIAM FETZER,
CHARLES J. BROOKS.